Oct. 22, 1935.  J. V. DONNER  2,018,057
LEER LOADER
Filed Oct. 27, 1933  2 Sheets-Sheet 1
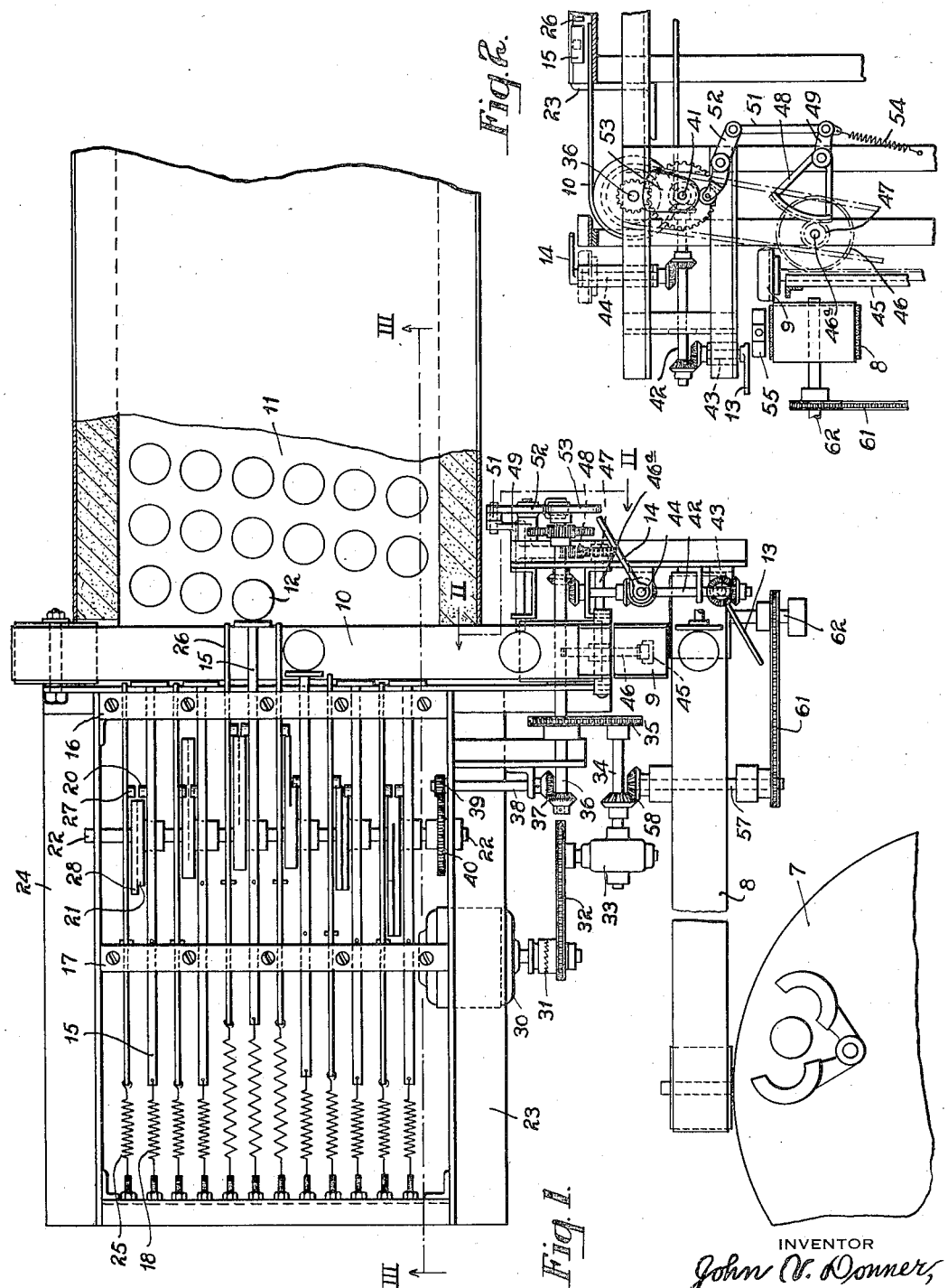
INVENTOR
John V. Donner,
By Archworth Martin,
Attorney.

Oct. 22, 1935.   J. V. DONNER   2,018,057
LEER LOADER
Filed Oct. 27, 1933   2 Sheets-Sheet 2
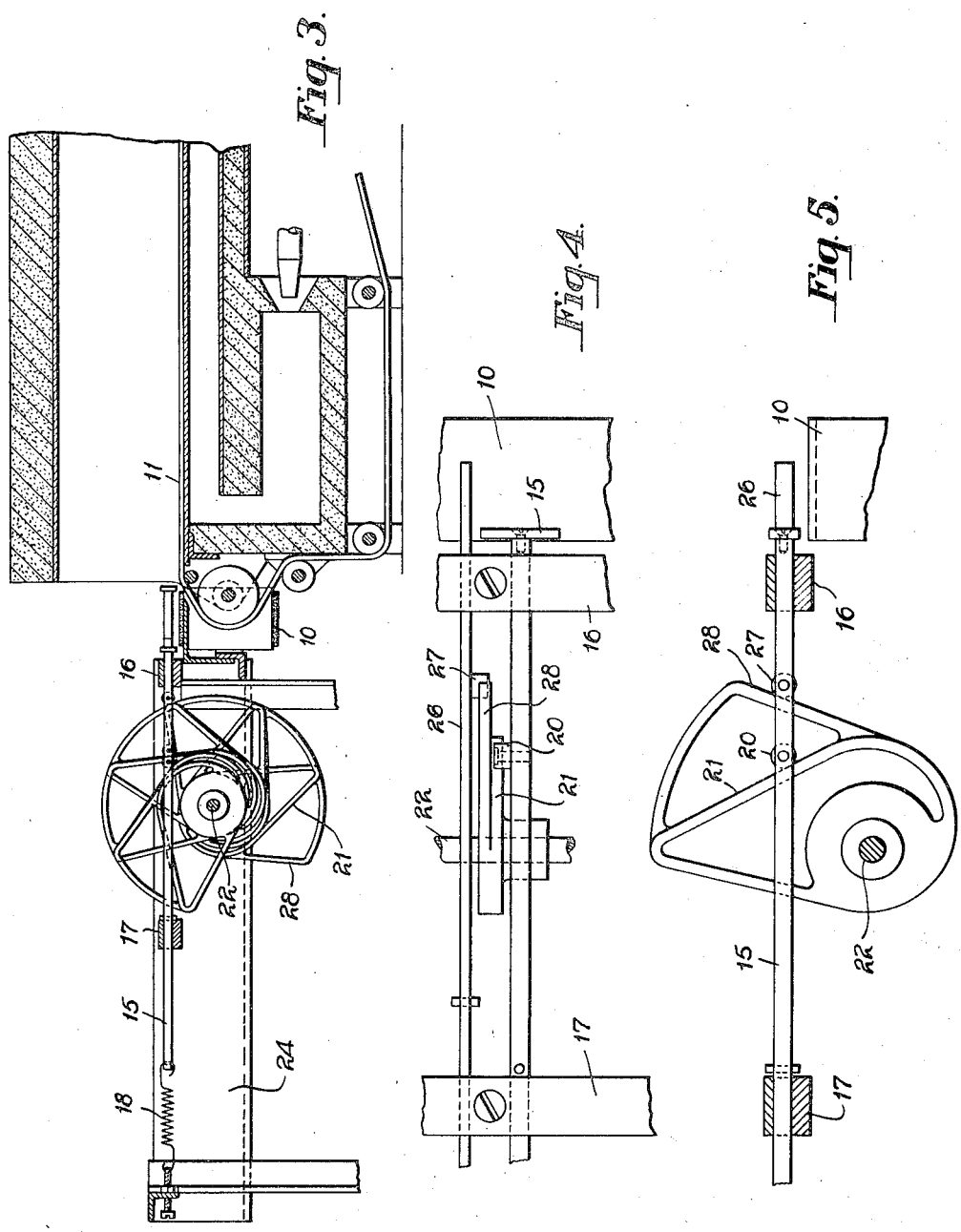
INVENTOR
John V. Donner,
By Archworth Martin,
Attorney.

Patented Oct. 22, 1935

2,018,057

UNITED STATES PATENT OFFICE 2,018,057

LEER LOADER

John V. Donner, Monaca, Pa.

Application October 27, 1933, Serial No. 695,440

2 Claims. (Cl. 198—31)

My invention relates to leer loaders, and includes apparatus for transferring glassware from a blowing or pressing machine to an annealing leer.

One object of my invention is to provide an improved form of apparatus for placing the articles upon a leer belt or conveyer, in non-contacting relation with one another, and in symmetrical arrangement.

My invention in one of its forms is illustrated in the accompanying drawings, wherein Figure 1 is a plan view of the apparatus; Fig. 2 is a view taken on the line II—II of Fig. 1; Fig. 3 is a view taken on the line III—III of Fig. 1; Fig. 4 is a plan view, on an enlarged scale, of a portion of the mechanism of Fig. 1, and Fig. 5 is a side elevational view thereof.

The apparatus is shown as employed for transferring glassware from a mold table 7 by a conveyer 8, an elevator or lifter 9, and a conveyer 10 to a leer belt 11. The ware 12 may be transferred from the molding machine 7 to the conveyer 8 in any suitable manner. Frequently, the conveyer which initially receives the ware from the molding machine is located at a lower plane than the leer belt conveyer, and in this case, an elevator or lifter 9 is required for raising the ware to a point where it can be transferred to the conveyer 10.

In the present instance, a rotating arm or wiper 13 is employed for pushing the articles off the conveyer 8 to the lifter 9, and after the lifter is elevated, a rotating arm or wiper 14 pushes it from the lifter to the belt 10. Pushers 15 are employed to transfer the articles from the conveyer 10 to the leer belt 11, such pushers being operated in predetermined sequence as hereinafter explained.

The pushers 15 are slidably supported in cross bars 16 and 17 and are normally held in their retracted positions by springs 18, one of which is provided for each pusher. Each pusher 15 is provided with a roller 20, as shown more clearly in Figs. 4 and 5, and these rollers are each engaged by a cam 21 that is secured to a shaft 22, which is journaled in the side arms 23—24 of the transfer apparatus.

A series of spacer bars 26 which serve also as stops for limiting traveling movement of the articles with the coneveyer 10 are likewise slidably supported in the cross bars 16 and 17 of the framework and are yieldably held in their retracted positions by springs 25. Weights and pulleys could, of course, be substituted for the springs. These bars are provided with cam rollers 27 that are engaged by cams 28 each of which may be formed integrally with its associated cam 21, but set somewhat in advance thereof as shown more clearly in Fig. 5, so that each spacer rod 26 will be pushed forward across the conveyer 10 in advance of its associated pusher 15.

The shaft 22 is driven from a suitable electric motor 30 or the like, through a clutch 31, a sprocket chain 32, a reducing gear device 33, a shaft 34, a sprocket chain 35, a shaft 36, bevel gears 37, a shaft 38, a pinion 39 and a gear wheel 40, the latter-named gear wheel 40 being secured to the shaft 22.

It will be seen that as the shaft 22 rotates, the cams 21 and 28 are driven to periodically advance the pushers 15 and the spacing rods 26, respectively, each spacing rod being pushed forward in advance of its associated pusher, so that it will be engaged by an article being advanced by the carrier 10, to stop further advance thereof, and permit the article 12 to be pushed onto the conveyer belt 11 in spaced relation to a preceding article, as shown in Fig. 1, in order that the articles will not be in contact with one another on the conveyer belt. The leer belt 11 can, of course, be driven in any suitable manner, either continuously or step-by-step.

The shaft 36 drives a counter shaft 41 which has bevelled gear connection with a shaft 42, which in turn has beveled gear connections with vertical shafts 43 and 44. The shaft 43 carries the wiper arm 13 for pushing articles off the conveyer 8 to the lifter 9, and the shaft 44 carries the wiper 14 for pushing articles off the lifter 9 to the conveyer 10.

The lifter 9 is slidably supported in a vertical guide 45, and has rack teeth meshing with an oscillatory gear wheel 46 which is mounted on a shaft 46a. A pinion gear 47 is mounted on the shaft 46a and meshes with a segmental gear 48, that is formed with a crank 49, which is pivotally supported in an upright member of the framework. A link 51 connects the crank 49 to a pivoted lever 52 that has a roller which contacts with a cam disc 53 that is secured to the shaft 41. A spring 54 maintains the cam roller or lever 52 in engagement with the cam 53. As the shaft 36 rotates, the crank 49 is oscillated about its pivot to effect rotative movements of the gear wheel 46, whereby the lifter 9 is raised and lowered.

The wipers 13 and 14 are simultaneously driven to pass across the upper surface of the belt 8, and the lifter, respectively, to effect transfer of articles from the conveyer 8 to the conveyer 10. A stop bar 55 is positioned above the conveyer 8, in order to prevent travel of the articles past the point at which they will be swept from the conveyer 8 by the wiper 13.

In the operation of the apparatus, the articles are transferred to conveyer 10 as heretofore explained. The pairs of cams 21—28 are offset relative to one another circumferentially of the shaft 22, so that said bars are successively brought into operative position to advance each spacer rod 26 and its associated pusher 15, successively. Thus, if an article is engaged by the spacer rod and the pusher at the rear end of the conveyer, the next article will be engaged by the succeeding spaced rod and its pusher, and so on until the foremost spacing rod and pusher have been brought into operation, whereupon the rearmost spacing rod and pusher will be again moved to operative position, and the cycle repeated. The rear sides of the cams 21—28 fall away quite abruptly relative to the front sides thereof, so that the bars 15 and 26 will snap back quickly as soon as an article has been transferred to the conveyer, to thus avoid obstructing movement of succeeding articles.

In order to secure synchronism between the moving parts, and particularly between the conveyer 8 and wiper 13, the lifter 9, and the wipers 14, I may drive the conveyer 8 by the motor which drives the wiper arms, and the cams 21—28. To this end I have shown a shaft 57 driven from the shaft 34 by bevel gears 58, and which drives a sprocket chain 61 which in turn has driving connection with a shaft 62 that drives the conveyer 8.

I claim as my invention:—

1. The combination with a leer belt, of apparatus for transferring articles thereto, comprising a conveyer movable in proximity to the belt, a series of stop bars movable across the conveyer to individually limit traveling movement of articles, a series of pusher bars movable across the conveyer to effect transfer of the articles to the leer belt, pairs of rotatable cams, each pair being arranged to operate a stop bar and a pusher bar, and a shaft for supporting said cams, the pairs of cams being offset relative to one another in directions circumferentially of said shaft.

2. The combination with a leer belt, of apparatus for transferring articles thereto, comprising a conveyer movable in proximity to the belt, a series of stop bars movable across the conveyer, to individually limit traveling movement of articles, a series of pusher bars movable across the conveyer to effect transfer of the articles to the leer belt, pairs of rotatable cams, each pair being arranged to operate a stop bar and a pusher bar, and a shaft for supporting said cams, the pairs of cams being offset relative to one another in directions circumferentially of said shaft, and that portion of each cam which operates the stop rod being positioned in advance of that portion which operates the pusher bar.

JOHN V. DONNER.